United States Patent [19]

Young

[11] 3,818,044

[45] June 18, 1974

[54] PREPARATION OF ZEARALANONE OR OF RACEMIC MIXTURES OF ZEARALANOL DIAMERS

[75] Inventor: Vernon V. Young, Terre Haute, Ind.

[73] Assignee: Commercial Solvents Corporation, Terre Haute, Ind.

[22] Filed: Jan. 17, 1972

[21] Appl. No.: 218,530

[52] U.S. Cl............................ 260/343.2 F, 424/279
[51] Int. Cl.............................................. C07d 9/00
[58] Field of Search............................ 260/343.2 F

[56] References Cited
UNITED STATES PATENTS

| | | | |
|---|---|---|---|
| 3,373,030 | 3/1968 | Hodge | 260/343.2 X |
| 3,503,994 | 3/1970 | Hodge | 260/343.2 |
| 3,687,982 | 8/1972 | Young | 260/343.2 |
| 3,697,548 | 10/1972 | Hodge | 260/343.2 |
| 3,704,248 | 11/1972 | Hodge | 260/343.2 |

*Primary Examiner*—John M. Ford
*Attorney, Agent, or Firm*—Morton, Bernard, Brown, Roberts & Sutherland

[57] ABSTRACT

Substantially colorless zearalanone is produced from zearalanol, for example from the low melting diamer of zearalanol, by (1) blocking the phenolic hydroxyl groups of the zearalanol, e.g., by converting them to acetate groups, (2) oxidizing the blocked zearalanol to blocked zearalanone, and (3) removing the blocking groups from the blocked zearalanone to obtain substantially colorless, unblocked zearalanone. Alternativly, the blocked zearalanone can be directly reduced to a high purity mixture of high and low melting diamers of zearalanol.

29 Claims, No Drawings

PREPARATION OF ZEARALANONE OR OF RACEMIC MIXTURES OF ZEARALANOL DIAMERS

This invention concerns the production of zearalanone from zearalanol, and the conversion of a monodiameric form of zearalanol to mixed diamers thereof. More particularly, it concerns an improved process of producing either high purity zearalanone from zearalanol, or a high purity mixture of zearalanol diamers from a substantially monodiameric form of zearalanol.

The compound zearalanol has two diastereoisomers, or diamers, one high melting, the other low melting. Both diamers are useful as anabolic substances for oral or parenteral administration to animals in the manner disclosed in U.S. Pat. No. 3,239,345. Depending on the intended use for the compound, however, it may be preferred to employ one or the other diamer in a major amount, or even exclusively. In such an instance, separation of the diamers can be effected by the method disclosed in U.S. Pat. No. 3,239,345, which method utilizes the different solubilities of the diamers in glacial acetic acid. The unwanted diamer, after such separation, can then be used as a source of more mixed diamers by oxidizing the unwanted diamer to zearalanone and then reducing the zearalanone back to a mixture of the two zearalanol diamers. There has heretofore existed a problem, however, in the step of oxidizing either or both zearalanol diamers to zearalanone — namely, the zearalanone obtained thereby has been tan in color. Pure zearalanone is known to be a substantially colorless (i.e., snow white) solid. Thus it would be desirable if there were a process by which zearalanol, in either diameric form, could be converted to substantially colorless, and therefore purer, zearalanone, or, alternatively, if there were a process by which a substantially monodiameric form of zearalanol, e.g., consisting essentially of low melting diamer, could be converted to a more pure mixture of both high and low melting zearalanol diamers than that provided by prior processes.

It has now been discovered that substantially colorless zearalanone can be produced from zearalanol by (1) blocking the phenolic hydroxyl groups (i.e., the —OH groups on the A ring) of the zearalanol with an organic blocking agent which converts those hydroxyl groups to removable ether or carboxylic acid ester groups, thus yielding blocked zearalanol, (2) reacting the blocked zearalanol with an oxidizing agent so as to oxidize the

group (i.e., the alcohol group on the B ring) of the blocked zearalanol to a

group, thus yielding blocked zearalanone, and (3) converting the ether or ester blocking groups of the blocked zearalanone back to phenolic hydroxyl groups, and thus yielding substantially colorless zearalanone. The resultant high purity zearalanone can then be reduced to a high purity mixture of zearalanol diamers, for example by the hydrogenation methods disclosed in U.S. Pat. No. 3,239,345 for reducing zearalenone, or the methods taught in commonly owned, U.S. patent applications of Edward B. Hodge, Ser. Nos. 25,265 (now U.S. Pat. No. 3,697,548) and 25,266 (now U.S. Pat. No. 3,704,248), filed Apr. 2, 1970.

The method disclosed in Ser. No. 25,265 comprises catalytically reducing the zearalenone, or, in the present case, zearalanone, with hydrogen under reducing conditions in the presence of a lower alkanol solvent containing about 0.001 to 5 percent, based on the volume of solvent, of a strong acid, e.g. hydrochloric, and an effective amount of platinum catalyst; the resultant zearalanol diamer mixture contains a major amount of the high melting diamer. The method disclosed in Ser. No. 25,266, however, results in a greater production of low melting zearalanol diamer by including a strong base such as sodium hydroxide in the alkanol solution and using a Raney nickel catalyst rather than platinum.

Alternatively, if desired, the blocked zearalanone can be directly reduced to a high purity mixture of zearalanol diamers, i.e., without first forming the high purity, unblocked zearalanone. Again, such reduction can be by hydrogenation in solution in an inert solvent, e.g., a lower alkanol, for instance by any of the methods disclosed in U.S. Pat. No. 3,239,345; Ser. No. 25,265; or Ser. No. 25,266.

The terms zearalanol and zearalanone conform with the nomemclature in an article in Tetrahedron Letters, Pergamon Press, Ltd., No. 27, pp. 3109–14 (1966). Thus, zearalanone has the formula:

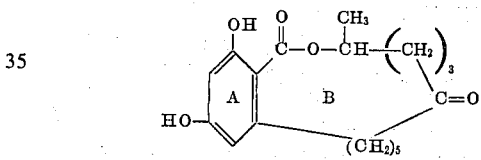

and zearalanol has the formula:

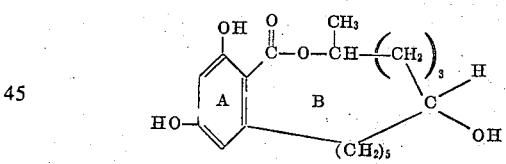

The process of this invention is useful with either diamer of zearalanol as starting material, or with a mixture of both. It may often be desired, however, to use the process for converting zearalanol of which the major portion, or even substantially all, is the low melting diamer.

The blocking of the phenolic hydroxyl groups of the zearalanol should be effective to provide ether or ester groups which are convertible back to hydroxyl groups but which will be substantially non-reactive with the oxidizing agent that is to be used in the next step to convert the

group to a

group.

Suitable ester group-producing blocking agents include carboxylic acids and anhydrides and halides thereof, para-toluene sulfonic acid, and methane sulfonic acid. Most preferred are alkanoic monocarboxylic acids, or their anhydrides or halides, of 2 to 20, preferably 2 to 5, carbon atoms, e.g., acetic acid, acetic anhydride, acetyl chloride, acetyl bromide, acetyl iodide, and acetyl fluoride.

Suitable ether group-producing blocking agents include, for example, methoxylating agents such as diazomethane and benzyloxylating agents such as benzyl chloride. Benzyloxylating agents are preferred, however, since the benzyl ether groups are not as difficult as the methyl ether groups to convert back to phenolic hydroxyls.

If the blocking agent employed is an acid, acid halide or acid anhydride which reacts with the phenolic hydroxyl groups to convert them to carboxylic acid ester groups, then it is often advantageous to effect the blocking reaction in the presence of an effective amount of a basic, esterification catalyst, for example an organic, nitrogenous base such as pyridine or piperidine.

The blocking reaction is preferably effected while the zearalanol is in solution in an inert, organic solvent. Most preferably the solvent is one which is at least partially miscible with water, such as, for example, pyridine or an aliphatic monoketone of up to 5 carbon atoms, e.g., acetone, methyethylketone, or diethylketone.

The preferred temperature of the blocking reaction will vary, depending upon the blocking agent employed. Where an inert solvent is used it is generally sufficient to reflux the reaction solution at atmospheric pressure. This will often mean the use of a reaction temperature somewhere in the range of about 20° to 100°C., e.g., about 20° to 40° or 60°C.

Reaction time will vary, too, but usually the reaction will be essentially complete in about 6 to 72 hours.

The amount of blocking agent preferably employed in the reaction is approximately that amount which is stoichiometrically required to block both phenolic hydroxyl groups on all of the zearalanol used in the reaction. The use of a significant excess of blocking agent is preferably avoided because the excess might react with the aliphatic hydroxyl group of the zearalanol. When using acetic anhydride, then, as the blocking agent, it is preferred that the molar ratio of acetic anhydride to zearalanol be about 2:1.

After the blocking reaction is completed, recovery of the blocked zearalanol can be effected by diluting the organic solvent reaction solution with sufficient water to separate the blocked zearalanol from the solution as a precipitate. The water dilution is ordinarily with about 1 to 5 volumes of water per volume of the organic solvent (e.g., acetone) used. The diluted solution is advantageously allowed to stand at a temperature of about 0° to 30°C. for a period of time sufficient for the blocked zearalanol to separate as a precipitate, ordinarily between about 6 and about 24 hours. The precipitated blocked zearalanol is then separated from its mother liquor by any convenient method, such as filtration. The separated blocked zearalanol can be purified, if desired, by recrystallization from a suitable organic solvent, such as ethyl acetate, methanol, or ethanol.

Suitable oxidizing agents for oxidizing the $$-\overset{\text{OH}}{\overset{|}{\text{C}}}\text{H}-$$

group of the blocked zearalanol to a $$-\overset{\text{O}}{\overset{\|}{\text{C}}}-$$

group are chromic acid and alkali metal chromates, preferably in the form of aqueous solutions. Preferably, these agents are employed in a ratio of about 1.5 gram atoms of chromium per mole of the blocked zearalanol.

Chromic acid is the preferred oxidizing agent and it is advantageously used in the form of a solution in aqueous sulfuric acid. Such a solution can be prepared, for example, by adding chromic anhydride ($CrO_3$) to concentrated (e.g., 95 weight percent) sulfuric acid, and then adding sufficient water to the mixture to form a complete solution. The minimum amount of water required to maintain the chromium ion in solution is preferably all that is employed, since large excesses of water can cause precipitation of the blocked zearalanol from the oxidation reaction solution. Thus it is generally preferred that the chromic acid solution contain no more than about 80 weight percent of water, and most preferably not more than about 65 weight percent thereof.

The preferred manner of bringing the reactants together for the oxidation reaction is by slowly adding an aqueous solution of the oxidizing agent to an inert organic solvent solution of the blocked zearalanol while stirring and maintaining the reaction mixture at oxidation temperature, e.g., about 0° to 60°C., most preferably about 20° to 30°C. Reaction time will vary, depending upon the particular oxidizing agent employed, the concentrations of reactants that are used, the temperatures employed, etc., but usually the reaction will be complete within about one hour. The same organic solvents as discussed above for the blocking reaction, but not pyridine, are generally useful for the oxidation reaction as well.

After the oxidation reaction is completed, recovery of the blocked zearalanone can be effected by diluting the organic solvent reaction solution with sufficient water to separate the blocked zearalanone from the solution as a precipitate. The water dilution also serves to redissolve any chromium salts. The water dilution is ordinarily with from about 1 to about 5 volumes of water per volume of the organic solvent (e.g., acetone) used. The diluted solution is advantageously allowed to stand at a temperature between about 0°C. and about 30°C. for a period of time sufficient for the blocked zearalanone to separate as a precipitate, ordinarily from about 6 to 24 hours. The precipitated blocked zearalanone is then separated from its mother liquor by any convenient method, such as filtration. The separated blocked zearalanone can be purified, if desired, by recrystallization from a suitable inert, organic solvent, such as a mixture of chloroform and petroleum ether, which is especially useful for recrystallizing zearalanone, 2,4-diacetate.

Where the phenolic hydroxyl groups have been converted to carboxylic acid ester groups in the blocking process, the unblocking reaction by which the ester groups are converted back to hydroxyl groups can be effected by either acidic or basic hydrolysis using any suitable hydrolyzing agent, such as, for example, alcoholic HCl or alcoholic metal hydroxide, e.g., alkali metal hydroxide. Lower monohydric alkanols are suitable alcohols, especially methanol and ethanol. The most preferred hydrolyzing agents are the alkanolic alkali metal hydroxides, e.g., methanolic sodium hydroxide. The alkanolic alkali metal hydroxides are solutions of alkali metal hydroxide in an alkanol, for example at an alkali metal hydroxide concentration of about 1 to 4 weight percent. The amount of alkali metal hydroxide used for the hydrolysis reaction is preferably at least that which is stoichiometrically required to unblock both of the phenolic hydroxyl groups of the zearalanone, i.e., is at least twice molar the amount of blocked zearalanone.

Where the phenolic hydroxyl groups have instead been converted to diphalic ether groups, e.g. methoxy groups, in the blocking process, then the preferred unblocking agents for converting those ether groups back to hydroxyl groups are HBr and HI. Where, however, the phenolic hydroxyl groups have been blocked by being converted to aromatic ether groups, e.g., benzyloxy groups, then the preferred unblocking agent for converting those ether groups back to hydroxyl groups is molecular hydrogen. The hydrogenation attacks the aromatic ether groups first and can be halted before it converts the ketone group as well.

The preferred manner of bringing the reactants together for the conversion of blocked zearalanone to unblocked zearalanone is by dissolving the blocked zearalanone in an inert organic solvent solution of the unblocking agent and then stirring the resultant solution at conversion temperature, e.g., in the case of hydrolizing ester groups, about 0° to 100°C. preferably about 20° to 30°C. Where molecular hydrogen is used as the unblocking agent it can simply be bubbled through a solution of the blocked zearalanone in an inert organic solvent, preferably a solvent that is itself devoid of hydroxyl groups. Reaction time will vary, depending upon the particular reactants used, the temperature employed, etc., but usually the reaction will be complete in about 1 to 24 hours.

After the unblocking reaction is completed, the recovery of the zearalanone can be effected by diluting the organic solvent reaction solution with sufficient water to separate the zearalanone from the solution as a precipitate. The water dilution is ordinarily with about 1 to 5 volumes of water per volume of the organic solvent (e.g., methanol) used. The diluted solution is advantageously allowed to stand at a temperature of about 0° to 30°C. for a period of time sufficient for the zearalanone to separate as a precipitate, ordinarily for about 6 to 24 hours. The precipitated zearalanone is then separated from its mother liquor by any convenient method, such as filtration. The separated zearalanone can be purified, if desired, by recrystallization from a suitable organic solvent, such as methanol, ethanol, or isopropanol.

The present invention may be better understood by reference to the following non-limiting examples:

EXAMPLE I

Blocking the Zearalanol

In each of the below-listed 4 runs an acetone solution of 32.0 g. of zearalanol (low-melting diastereoisomer), 20.0 ml. of acetic anhydride, and 20.0 ml. of pyridine was aged at 25°–30°C. for 72 hours. At the end of the aging period, the solution was diluted with about 4 to 5 volumes of water so as to effect precipitation of the blocked zearalanol product. The precipitated zearalanol, 2,4-diacetate was isolated and dried.

| Run | Acetone, ml. | Crude Zearalanol, 2,4-Diacetate | | |
|---|---|---|---|---|
| | | Wt. (g) | M. P., °C. | Yield, % |
| 1a | 80[1] | 39.2 | 97–103 | 98.0 |
| 2a | 160 | 38.3 | 103–110 | 95.8 |
| 3a | 240 | 39.2 | 108–113 | 98.0 |
| 4a | 320 | 38.1 | 109–114 | 97.8 |

[1] At this concentration a side reaction, acetylation at the 6'-position (on the B ring), was indicated by thin layer chromatographic analysis.

The crude diacetate of Run 1a was recrystallized by dissolving 1.0 g. in 3.0 ml. of ethyl acetate, followed by the addition of 9.0 ml. of n-hexane. The recrystallized material melted at 119°–120°C.

Oxidizing the Blocked Zearalanol

Solutions of the zearalanol, 2,4-diacetate products prepared above (30.0 g. in 300 ml. of acetone) were stirred and treated with 25.0 ml. of standard chromic acid solution (25.0 g. chromic oxide and 20.0 ml. concentrated sulfuric acid, diluted to 100 ml. with water) at room temperature. Each of the resultant mixtures are stirred for 30 minutes and isopropyl alcohol (10 ml.) was added thereto in order to quench the excess chromic acid. Stirring was then continued for an additional 20 minutes. The mixture was then filtered and the filtrate was diluted with two volumes of water in order to effect precipitation of the blocked zearalanone. The precipitated zearalanone, 2,4-diacetate was isolated, rinsed with water, and dried.

| Run | Zearalanol, 2,4-Diacetate From Run | Crude Zearalanone, 2,4-Diacetate | | |
|---|---|---|---|---|
| | | Wt. (g) | M.P., °C. | Yield, % |
| 1b | 1a* | 27.6 | 153–154 | 92.0 |
| 2b | 2a | 26.5 | 140–143 | 88.3 |
| 3b | 3a | 26.6 | 140–146 | 88.7 |
| 4b | 4a | 26.4 | 144–147 | 88.0 |

*Recrystallized

Converting the Blocked Zearalanone to Unblocked Zearalanone

Two grams each of the zearalanone, 2,4-diacetate products prepared above was dissolved in 10 ml. of 4 wt. % methanolic sodium hydroxide solution at room temperature. Each of the resultant solutions was stirred for 2 hours and then diluted with 5 volumes of water. The pH of the diluted solution was then adjusted to 5–6, using dilute hydrochloric acid in Runs 1c and 2c and dilute sulfuric acid in Runs 3c and 4c, in order to effect precipitation of the unblocked zearalanone. The precipitated zearalanone was then isolated and dried.

| Run | Zearalanone, 2,4-Diacetate From Run | Crude Zearalanone Wt. (g) | M.P., °C. | Yield, % |
| --- | --- | --- | --- | --- |
| 1c | 1b | 1.5 | 195–197 | 93.7 |
| 2c | 2b | 1.6 | 187–190 | 100.0 |
| 3c | 3b | 1.5 | 189–191 | 93.7 |
| 4c | 4b | 1.6 | 189–193 | 100.0 |

The crude zearalanone was recrystallized from methanol. The recrystallized product melted at 195°–196°C.

EXAMPLE II

Converting Unblocked Zearalanol to Blocked Zearalanone

In each of the below-listed runs a solution of 8.0 g. of zearalanol (low melting), 5.0 ml. of acetic anhydride, and 5.0 ml. of pyridine in 80 ml. of acetone was allowed to stand at 25°–30°C. for 72 hours. At the end of the holding period 3.5 ml. of concentrated sulfuric acid was added, followed by the addition of 6.5 ml. of standard chromic acid solution. The resultant mixture was stirred for 30 minutes, after which isopropyl alcohol (5.0 ml.) was added and stirring continued for an additional 30 minutes. The reaction mixture was diluted with 2 volumes of water, and the precipitated zearalanone, 2,4-diacetate was collected on a filter, rinsed with water, and dried.

| Run | Crude Zearalanone, 2,4-Diacetate Wt. (g) | M.P., °C. | Yield, % |
| --- | --- | --- | --- |
| 5 | 9.20 | 140–144 | 92.0 |
| 6 | 8.65 | 144–147 | 86.5 |
| 7 | 8.40 | 144–148 | 84.0 |
| 8 | 8.65 | 146–151 | 86.5 |
| 9 | 8.60 | 141–145 | 86.0 |
| 10* | 35.9 | 143–148 | 89.8 |

*32.0 g. of zearalanol was used.

A sample of crude zearalanone, 2,4-diacetate was recrystallized by dissolving 1.0 g. in 2.5 ml. of chloroform, followed by the addition of 5.0 ml. of petroleum ether. The recrystallized product melted at 153°–154°C.

EXAMPLE III

Converting Blocked Zearalanone to Unblocked Zearalanol

In each of 8 separate runs, 8 grams of zearalanone, 2,4-diacetate in 100 ml. of methanol was hydrogenated over Raney nickel catalyst at 60°–65°C. under 60 psi of hydrogen for 6 hours. The catalyst was then removed and 40 ml. of 1N sodium hydroxide was added. The solution was stirred for 30 minutes, diluted with 3 to 4 volumes of water, and acidified with dilute hydrochloric acid. The precipitated mixture of zearalanol diamers was collected on a filter, dried, and analyzed. Analysis showed the products to be of very high purity. The amount of high melting diamer in the mixture ranged from 45.8 to 51.2 percent. Melting points ranged from 138°C. to 151°C.

I claim:

1. A process for converting zearalanol to substantially colorless zearalanone comprising blocking the phenolic hydroxyl groups of zearalanol with an organic blocking agent which converts the phenolic hydroxyl groups of zearalanol to ether or carboxylic acid ester groups that are substantially non-reactive with chromic acid and alkali metal chromates, thus yielding blocked zearalanol, reacting the blocked zearalanol with an oxidizing agent selected from the group consisting of chromic acid and alkali metal chromates so as to oxidize the

group of the blocked zearalanol to a

group, thus yielding blocked zearalanone, and unblocking the blocked zearalanone with an unblocking agent which converts the ether or ester groups of blocked zearalanone back to phenolic hydroxyl groups, thus yielding zearalanone.

2. The process of claim 1 wherein the blocking agent is a carboxylic acid or carboxylic acid halide or anhydride which converts the phenolic hydroxyl groups to carboxylic acid ester groups.

3. The process of claim 2 wherein the blocking agent is an alkanoic monocarboxylic acid of 2 to 20 carbon atoms or a halide or anhydride thereof.

4. The process of claim 3 wherein the blocking agent is acetic anhydride.

5. The process of claim 4 wherein the blocking of the phenolic hydroxyl groups of the zearalanol is effected by contacting a solution of the zearalanol in an inert, organic solvent with acetic anhydride at about 20° to 100°C.

6. The process of claim 5 wherein the contacting is conducted in the presence of an effective amount of a basic, esterification catalyst.

7. The process of claim 6 wherein the catalyst is an organic, nitrogenous base.

8. The process of claim 7 wherein the catalyst is pyridine.

9. The process of claim 1 wherein the oxidizing of the

group of the blocked zearalanol to a

group is effected by contacting a solution of the blocked zearalanol in an inert, organic solvent at about 0° to 60°C. with the oxidizing agent.

10. The process of claim 9 wherein the oxidizing agent is chromic acid.

11. The process of claim 10 wherein the chromic acid is in solution in aqueous sulfuric acid.

12. The process of claim 2 wherein the unblocking agent is a metal hydroxide.

13. The process of claim 12 wherein the unblocking agent is an alkali metal hydroxide.

14. The process of claim 13 wherein the unblocking agent is sodium hydroxide.

15. The process of claim 14 wherein the sodium hydroxide is in solution in a lower monohydric alkanol.

16. The process of claim 15 wherein the sodium hydroxide is in solution in methanol and the unblocking is effected by contacting the blocked zearalanone with the solution of sodium hydroxide at about 0° to 100°C., and in a ratio of at least 2 moles of sodium hydroxide per mole of blocked zearalanone.

17. The process of claim 1 wherein at least the major portion of the zearalanol is the low melting diamer.

18. The process of claim 17 where substantially all of the zearalanol is the low melting diamer.

19. A process for converting zearalanol to substantially colorless zearalanone comprising
   i. contacting a solution of zearalanol in an inert, organic solvent at about 20° to 60°C. with (a) acetic anhydride and (b) an esterification catalyzing amount of pyridine, thus yielding zearalanol, 2,4-diacetate;
   ii. contacting an inert, organic solvent solution of the zearalanol, 2,4-diacetate at about 20° to 30°C. with an aqueous sulfuric acid solution of chromic acid, thus yielding zearalanone, 2,4-diacetate; and
   iii. contacting the zearalanone, 2,4-diacetate at about 20° to 30°C. with a methanol solution of sodium hydroxide in a ratio of at least 2 moles of sodium hydroxide per mole of zearalanone, 2,4-diacetate, thus yielding zearalanone.

20. The process of claim 19 wherein the inert, organic solvent employed in steps (i) and (ii) is acetone.

21. The process of claim 20 wherein at least the major portion of the zearalanol is the low melting diamer.

22. The process of claim 21 wherein substantially all of the zearalanol is the low melting diamer.

23. A process for converting substantially monodiameric zearalanol to a mixture of high and low melting diamers of zearalanol comprising blocking the phenolic hydroxyl groups of the substantially monodiameric zearalanol with an organic blocking agent which converts the phenolic hydroxyl groups of zearalanol to ether or carboxylic acid ester groups that are substantially non-reactive with chromic acid and alkali metal chromates, thus yielding blocked zearalanol, reacting the blocked zearalanol with an oxidizing agent selected from the group consisting of chromic acid and alkali metal chromates so as to oxidize the

group of the blocked zearalanol to a

group, thus yielding blocked zearalanone, and hydrogenating the blocked zearalanone to a mixture of the high and low melting diamers of zearalanol.

24. The process of claim 23 wherein the blocking agent is a carboxylic acid or carboxylic acid halide or anhydride which converts the phenolic hydroxyl groups to carboxylic acid ester groups.

25. The process of claim 24 wherein the blocking agent is an alkanoic monocarboxylic acid of two to 20 carbon atoms or a halide or anhydride thereof.

26. The process of claim 25 wherein the blocking agent is acetic anhydride.

27. A process for converting substantially monodiameric zearalanol to a mixture of high and low melting diamers of zearalanol comprising
   i. contacting a solution of the substantially monodiameric zearalanol in an inert, organic solvent at about 20° to 60°C. with (a) acetic anhydride and (b) an esterification catalyzing amount of pyridine, thus yielding zearalanol, 2,4-diacetate;
   ii. contacting an inert, organic solvent solution of the zearalanol, 2,4-diacetate at about 20° to 30°C. with an aqueous sulfuric acid solution of chromic acid, thus yielding zearalanone, 2,4-diacetate; and
   iii. hydrogenating the zearalanone, 2,4-diacetate to a mixture of the high and low melting diamers of zearalanol.

28. The process of claim 27 wherein the inert, organic solvent employed in steps (i) and (ii) is acetone.

29. The process of claim 28 wherein the substantially monodiameric zearalanol is the low melting diamer.

* * * * *